United States Patent
Saito

(10) Patent No.: US 11,961,400 B2
(45) Date of Patent: Apr. 16, 2024

(54) PASSENGER VEHICLE AND OPERATION MANAGEMENT SYSTEM

(71) Applicant: TOYOTA JIDOSHA KABUSHIKI KAISHA, Toyota (JP)

(72) Inventor: Hidenori Saito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 17/831,613

(22) Filed: Jun. 3, 2022

(65) Prior Publication Data

US 2022/0415172 A1 Dec. 29, 2022

(30) Foreign Application Priority Data

Jun. 29, 2021 (JP) ................. 2021-107861

(51) Int. Cl.
- *G08G 1/133* (2006.01)
- *G06V 20/52* (2022.01)
- *G06V 20/59* (2022.01)

(52) U.S. Cl.
CPC ............ *G08G 1/133* (2013.01); *G06V 20/53* (2022.01); *G06V 20/593* (2022.01)

(58) Field of Classification Search
None
See application file for complete search history.

(56) References Cited

U.S. PATENT DOCUMENTS

| 11,606,409 B1* | 3/2023 | Ergen ................... H04L 65/612 |
| 2019/0119970 A1* | 4/2019 | Erlacher .............. G06V 40/103 |
| 2021/0174805 A1* | 6/2021 | Wang ..................... G10L 25/63 |
| 2022/0114691 A1* | 4/2022 | Morikawa ............. G06Q 50/40 |
| 2022/0415172 A1* | 12/2022 | Saito .................... G06V 20/593 |
| 2023/0010512 A1* | 1/2023 | Sharma ................. H04L 47/25 |
| 2024/0022565 A1* | 1/2024 | Keith, Jr. ............ H04L 63/0442 |

FOREIGN PATENT DOCUMENTS

| JP | 2008-065759 A | 3/2008 |
| JP | 2008-120574 A | 5/2008 |
| JP | 2012-098908 A | 5/2012 |
| JP | 2017-134687 A | 8/2017 |
| JP | 2021-39582 A | 3/2021 |
| JP | 2021-51431 A | 4/2021 |

* cited by examiner

*Primary Examiner* — Fekadeselassie Girma
(74) *Attorney, Agent, or Firm* — Oliff PLC

(57) ABSTRACT

A congestion rate calculation unit calculates a congestion rate in the cabin based on the number of recognized passengers. When the congestion rate is more than a predetermined congestion threshold, an in-vehicle display and an in-vehicle speaker are capable of giving an alighting notification that notifies the presence of a passenger who is alighting at the next stop and seat information of the passenger, and does not make an alighting notification when the congestion rate is less than or equal to the congestion threshold in the process of the passenger vehicle heading to the next stop.

10 Claims, 12 Drawing Sheets

| | TARGET TIME | ACTUAL TIME | CONGESTION RATE | BOARDING REQUEST | PASSENGER AGE | ALIGHTING REQUEST | ALIGHTING PASSENGER AGE |
|---|---|---|---|---|---|---|---|
| PASSING OPERATION SCHEDULE UPDATE POINT Pu | 7:10 | TRAVELING | | | | | |
| ARRIVE AT STOP ST1 | 7:20 | | | NONE | | NONE | |
| DEPART FROM STOP ST1 | 7:23 | | | | | | |
| PASSING COLLECTION POINT Pout | 7:35 | | | | | | |
| PASSING SENDING POINT Pin | 7:36 | | | | | | |
| ARRIVE AT STOP ST2 | 7:42 | | | 42B | AGE 9 | NONE | |
| DEPART FROM STOP ST2 | 7:45 | | | | | | |
| ARRIVE AT STOP ST3 | 7:55 | | | 42D 42E | AGE 65 AGE 63 | 42B | AGE 9 |
| DEPART FROM STOP ST3 | 7:58 | | | | | | |

FIG.4

| | TARGET TIME | ACTUAL TIME | CONGESTION RATE | BOARDING REQUEST | PASSENGER AGE | ALIGHTING REQUEST | ALIGHTING PASSENGER AGE |
|---|---|---|---|---|---|---|---|
| PASSING OPERATION SCHEDULE UPDATE POINT Pu | 7:10 | 7:10 | | | | | |
| ARRIVE AT STOP ST1 | 7:20 | 7:21 | | NONE | | NONE | |
| DEPART FROM STOP ST1 | 7:23 | 7:23 | 25% | | | | |
| PASSING COLLECTION POINT Pout | 7:35 | 7:35 | | | | | |
| PASSING SENDING POINT Pin | 7:36 | 7:36 | | | | | |
| ARRIVE AT STOP ST2 | 7:42 | 7:42 | | 42B | AGE 9 | NONE | |
| DEPART FROM STOP ST2 | 7:45 | 7:46 | 75% | | | | |
| ARRIVE AT STOP ST3 | 7:55 | TRAVELING | | 42D 42E | AGE 65 AGE 63 | 42B | AGE 9 |
| DEPART FROM STOP ST3 | 7:58 | | | | | | |

FIG. 10

PASSENGER VEHICLE AND OPERATION MANAGEMENT SYSTEM

CROSS REFERENCE TO RELATED APPLICATION

This application claims priority to Japanese Patent Application No. 2021-107861, filed on Jun. 29, 2021, which is incorporated herein by reference in its entirety including the specification, claims, drawings, and abstract.

TECHNICAL FIELD

The present specification discloses a passenger vehicle, and an operation management system that includes the passenger vehicle.

BACKGROUND

Systems that support passengers in boarding and alighting passenger vehicles have been known. For example, the system described in JP 2017-134687 A displays an alighting support notification on the display unit of a mobile terminal owned by a passenger when the scheduled alighting stop requested by the passenger on the passenger vehicle is the next stop of the passenger vehicle. The alighting support notification includes, for example, a message prompting the passenger to alight at the next stop or to press the stop button.

The system described in JP 2008-65759 A displays a screen on the in-vehicle display unit that prompts the passenger to alight at the next stop when the scheduled alighting stop requested by the passenger is the next stop. The display of alighting information on the in-vehicle display unit will improve the alighting environment by, for example, having other passengers move their standing positions.

Further, JP 2008-120574 A discloses an elevator boarding and alighting notification apparatus. This notification apparatus receives information about the floor on which the passenger is alighting in advance from a mobile terminal carried by the passenger. When the stop floor of the elevator cage in which the passenger is riding and the stop floor information match, for example, a message such as "Exiting" or a voice message such as "Someone is getting out on this floor" will be announced in the cage.

Incidentally, providing alighting notification that notifies other passengers in the vehicle that a passenger alighting at the next stop is in the vehicle improves the alighting environment by, for example, having standing passengers move to secure the line of flow to the exit (exit route). On the other hand, if an alighting notification is made during a low-congestion time when the exit route is already secured, passengers may be prompted to make unnecessary movements.

Therefore, the present specification discloses an operation management system and a passenger vehicle capable of giving alighting notifications according to the boarding status in the vehicle.

SUMMARY

The present specification discloses a passenger vehicle and an operation management system that includes an operation management apparatus. The passenger vehicle is capable of traveling along a defined route and stopping at stops along the defined route. The operation management apparatus manages operation of the passenger vehicle. The passenger vehicle includes an imaging device that captures an image of the interior of a cabin. The operation management apparatus includes an image recognition unit and a congestion rate calculation unit. The image recognition unit recognizes passengers in the in-cabin image captured by the imaging device in the process of the passenger vehicle leaving the current stop and heading to the next stop. The congestion rate calculation unit calculates a congestion rate in the cabin based on the recognized passengers. The passenger vehicle further includes a notification unit. When the congestion rate exceeds a predetermined congestion threshold, the notification unit can make an alighting notification that notifies the passengers that there is a passenger who is going to alight at the next stop and the seat information of the passenger. On the other hand, when the congestion rate is less than or equal to the congestion threshold, the notification unit does not make an alighting notification in the process of the passenger vehicle heading to the next stop.

According to the above configuration, when the congestion rate is less than or equal to the congestion threshold; i.e., when the congestion rate is low, no alighting notification is made. This prevents passengers from being prompted to make unnecessary movements.

In the above configuration, the operation management apparatus also includes a storage unit, a determination unit, and a command unit. The storage unit stores boarding/alighting requests with scheduled alighting stops, and reserved seats in the passenger vehicle. The determination unit is capable of referring to the boarding/alighting requests and making an alighting determination of determining whether or not the next stop of the passenger vehicle is set as the scheduled alighting stop. The command unit commands the notification unit to make an alighting notification when the alighting determination determines that the next stop of the passenger vehicle is set as the scheduled alighting stop. The determination unit executes alighting determination when the congestion rate is more than the congestion threshold, while it does not execute alighting determination when the congestion rate is less than or equal to the congestion threshold.

The above configuration reduces the processing burden on the operation management apparatus, which is the main determination maker, by not executing the alighting determination when the congestion rate is low.

In the above configuration, the operation management apparatus also includes a storage unit, a determination unit, and a command unit. The storage unit stores boarding/alighting requests with scheduled alighting stops, and reserved seats in the passenger vehicle. The determination unit refers to the boarding/alighting requests and performs an alighting determination to determine whether or not the next stop of the passenger vehicle is set as the scheduled alighting stop. The command unit is capable of commanding the notification unit to make an alighting notification when the alighting determination determines that the next stop of the passenger vehicle is set as the scheduled alighting stop. The command unit commands the notification unit to make an alighting notification when the congestion rate is more than the congestion threshold, while it does not command the notification unit to make an alighting notification when the congestion rate is less than or equal to the congestion threshold.

According to the above configuration, the command unit does not give a notification command to make an alighting notification when the congestion rate is low, and as a result, the notification unit of the passenger vehicle does not make an alighting notification.

In the above configuration, the determination unit may exclude from the target of alighting determination the boarding/alighting request that sets a seat included within a predetermined vicinity from the exit of the passenger vehicle as a reserved seat.

In the above configuration, no alighting notification is made when the passenger seated in a seat near the exit, where the exit route is short, is alighting.

In the above configuration, a boarding/alighting request may include the age information of the prospective passenger in association with the scheduled alighting stop and the reserved seat of the passenger. In this case, the determination unit may exclude from the target of the alighting determination the boarding/alighting request in which a seat included within a predetermined vicinity from the exit of the passenger vehicle is set as a reserved seat and the age of the prospective passenger is more than a predetermined age threshold.

In the above configuration, when the passenger is a child or other younger person, the passenger is subject to alighting notification regardless of the seat position. This will ensure smooth alighting for younger passengers.

The present specification also discloses a passenger vehicle capable of traveling along a defined route and stopping at stops along the defined route. The passenger vehicle includes an imaging device, an image recognition unit, a congestion rate calculation unit, and a notification unit. The imaging device captures images of the interior of a cabin. The image recognition unit recognizes passengers in the in-cabin image taken by the imaging device in the process of leaving the current stop and heading to the next stop. The congestion rate calculation unit calculates a congestion rate in the cabin based on the recognized passengers. When the congestion rate exceeds a predetermined congestion threshold, the notification unit can make an alighting notification that notifies the passengers that there is a passenger who is going to alight at the next stop and the seat information of the passenger. On the other hand, when the congestion rate is less than or equal to the congestion threshold, the notification unit does not make an alighting notification in the process of heading to the next stop.

In the above configuration, the passenger vehicle may also include a storage unit, a determination unit, and a command unit. The storage unit stores boarding/alighting requests including the information of scheduled alighting stops and reserved seats. The determination unit is capable of referring to the boarding/alighting requests and making an alighting determination of determining whether or not the next stop is set as the scheduled alighting stop. The command unit commands the notification unit to make an alighting notification when the alighting determination determines that the next stop is set as the scheduled alighting stop. The determination unit executes alighting determination when the congestion rate is more than the congestion threshold, while it does not execute alighting determination when the congestion rate is less than or equal to the congestion threshold.

In the above configuration, the passenger vehicle may also include a storage unit, a determination unit, and a command unit. The storage unit stores boarding/alighting requests including the information of scheduled alighting stops and reserved seats. The determination unit refers to the boarding/alighting requests and performs an alighting determination to determine whether or not the next stop is set as the scheduled alighting stop. The command unit is capable of commanding the notification unit to make an alighting notification when the alighting determination determines that the next stop is set as the scheduled alighting stop. The command unit commands the notification unit to make an alighting notification when the congestion rate is more than the congestion threshold, while it does not command the notification unit to make an alighting notification when the congestion rate is less than or equal to the congestion threshold.

In the above configuration, the determination unit may exclude from the target of alighting determination the boarding/alighting request that sets a seat included within a predetermined vicinity from the exit as a reserved seat.

In the above configuration, the boarding/alighting request may include the age information of the prospective passenger in association with the information about the scheduled alighting stop and the reserved seat. In this case, the determination unit excludes from the target of the alighting determination the boarding/alighting request in which a seat included within a predetermined vicinity from the exit is set as a reserved seat and the age of the prospective passenger is more than a predetermined age threshold.

The passenger vehicle and the operation management system disclosed in the present specification enable making alighting notifications according to the boarding status in the vehicle.

BRIEF DESCRIPTION OF DRAWINGS

Embodiment(s) of the present disclosure will be described based on the following figures, wherein:

FIG. 4 illustrates an operation schedule table;

FIG. 10 is a diagram illustrating an operation schedule for a passenger vehicle traveling on a defined route;

DESCRIPTION OF EMBODIMENTS

Figure 1:
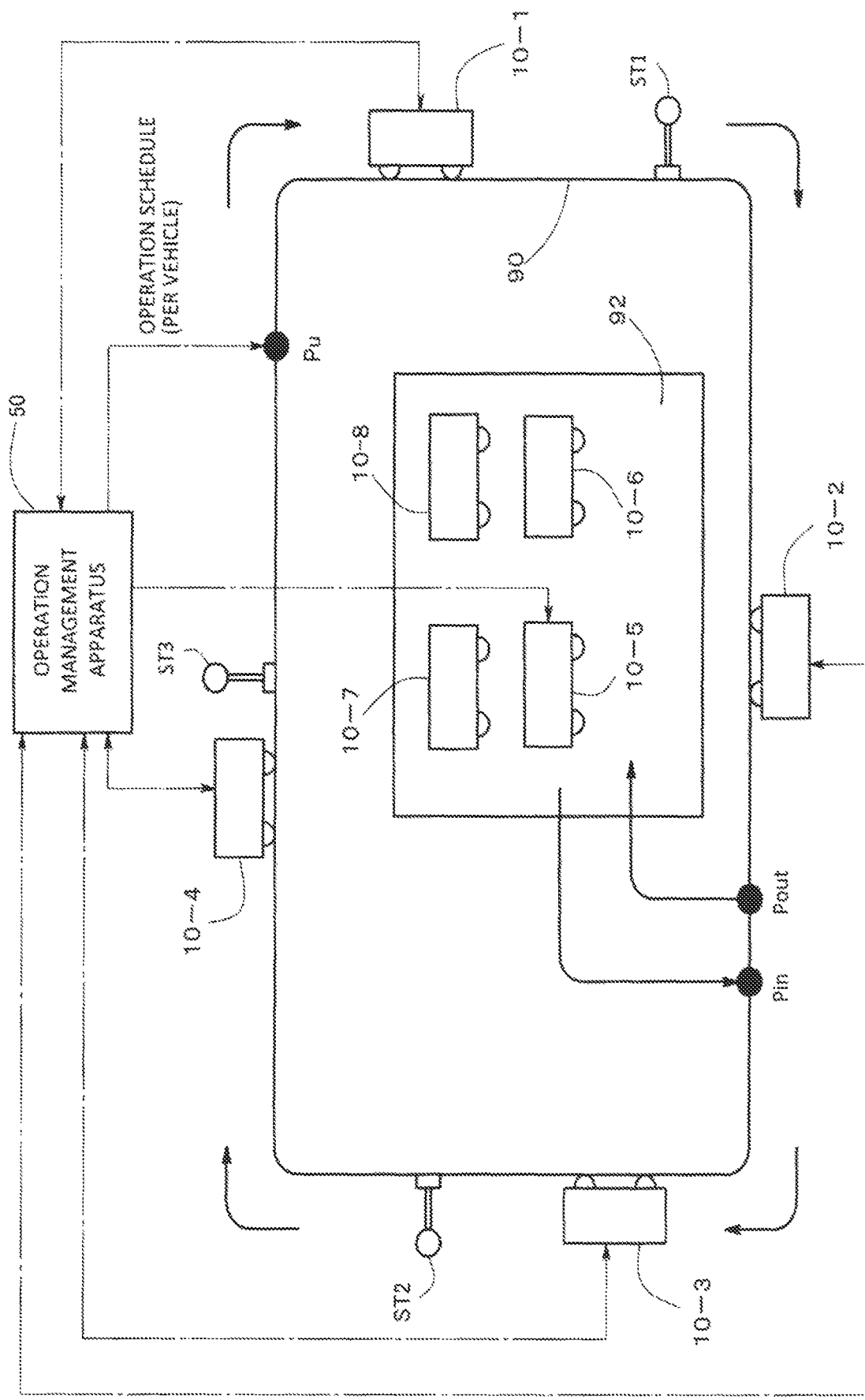
FIG. 1 illustrates a transportation service provided by the operation management system according to an embodiment of the present disclosure.

An embodiment of the operation management system according to the present specification is described below with reference to drawings. The shapes, materials, number of pieces, and numerical values described below are examples for illustration purposes, and may be changed as appropriate according to the specifications of the operation management system. In the following, the same reference numerals are assigned to the same elements in all the drawings.

Transportation Service

FIG. 1 schematically illustrates a transportation service provided by an operation management system according to the present embodiment. The operation management system includes a plurality of passenger vehicles 10-1 to 10-8, and an operation management apparatus 50 that manages the operation of the passenger vehicles 10-1 to 10-8.

In the transportation service illustrated in FIG. 1, passenger vehicles 10 travel along a defined route 90, which is an operation route, whereby an unspecified number of users are transported. The defined route 90 may be, for example, a circulating route. The passenger vehicles 10 circulate in a one-way direction on the defined route 90 as illustrated by arrows in the figure. The passenger vehicles 10 can stop at stops ST1 to ST3 along the defined route 90.

The defined route 90 may be, for example, a reserved road on which only the passenger vehicles 10 are allowed to travel. When the passenger vehicles 10 are railway vehicles, the defined route 90 may be a circulating line. Alternatively, the defined route 90 may be a route set on a general road that is open to vehicles other than the passenger vehicles 10.

Furthermore, a garage 92 is provided in connection with the defined route 90. FIG. 1 illustrates passenger vehicles 10-5 to 10-8 waiting in the garage 92. As connection points to the garage 92, a collection point Pout and a sending point Pin are provided on the defined route 90.

There is also an operation schedule update point (Pu) on the defined route 90 that sends the respective operation schedules to the passenger vehicles 10-1 to 10-4 in operation. At the schedule update point Pu, the operation management apparatus 50 provides the passenger vehicles 10 passing through the point with a schedule of the passenger vehicle 10 for one round of operation starting from the operation schedule update point Pu.

As will be described later, in the operation management system according to the present embodiment, whether to make or not to make an alighting notification is decided according to the congestion rate in the vehicle. When a boarding/alighting request, in which the next stop is set as the scheduled alighting stop, is set in the operation schedule as illustrated in FIG. 4, the alighting notification informs the passengers in the vehicle of the presence of a passenger who is alighting at the next stop and the seat information of the alighting passenger.

This alighting notification is made in the process of the passenger vehicle 10 leaving the current stop and heading to the next stop. By giving an alighting notification before arriving at the next stop, for example, standing passengers are prompted to move so as to secure the exit route. In addition, since the alighting notification includes information on the seat where the alighting passenger is seated, other passengers in the vehicle can understand the starting point of the exit route that ends at the exit (i.e., the seat of the alighting passenger).

Furthermore, in the operation management system of the present embodiment, during low-congestion times when the congestion rate in the vehicle is lower than a predetermined congestion threshold, no alighting notification is made. Since no alighting notification is made during low congestion times when the exit route is secured, unnecessary movement of standing passengers can be controlled.

Overall Configuration of Operation Management System

Figure 2:
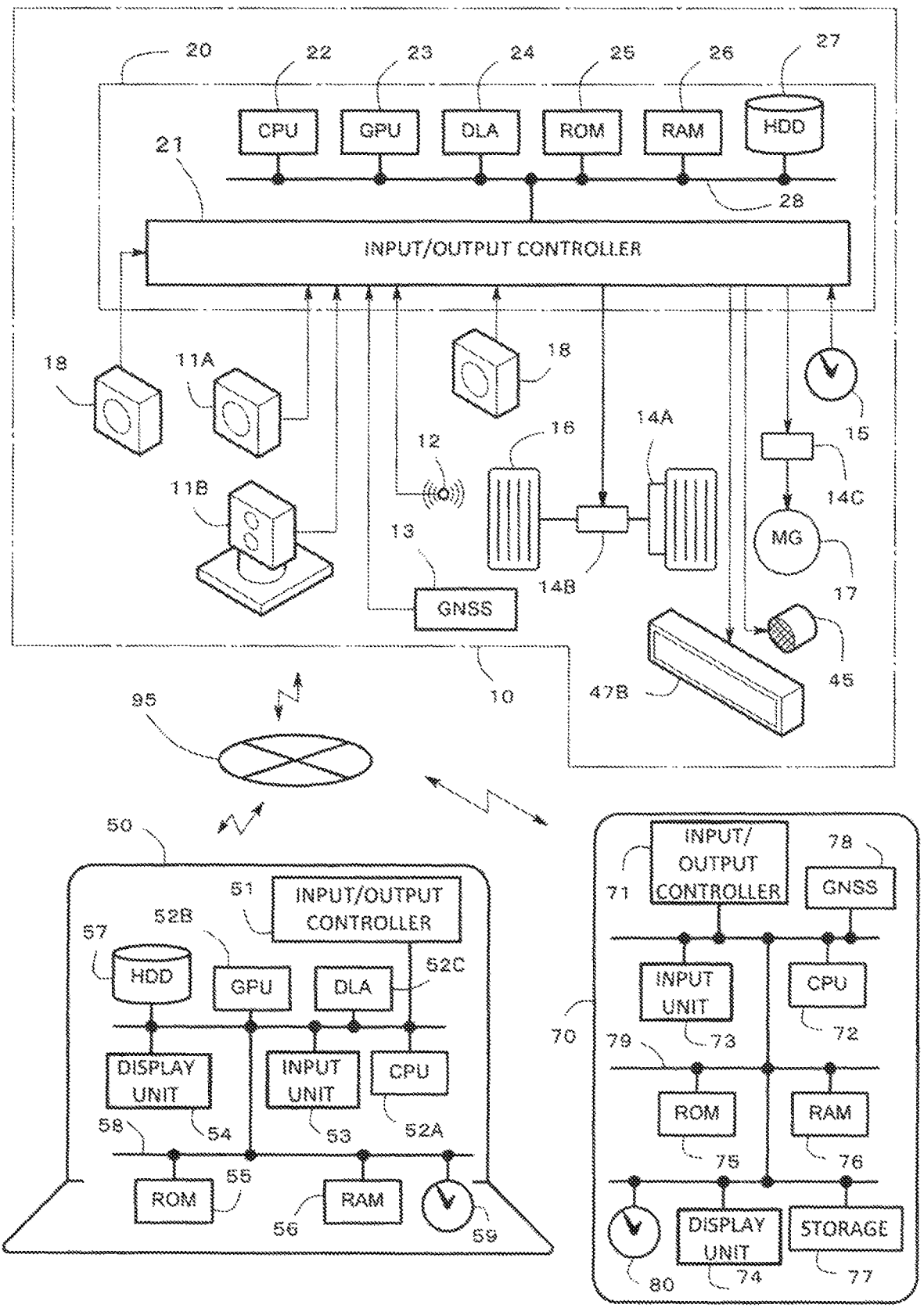
FIG. 2 illustrates a hardware configuration of the operation management system according to the embodiment.
Figure 3:
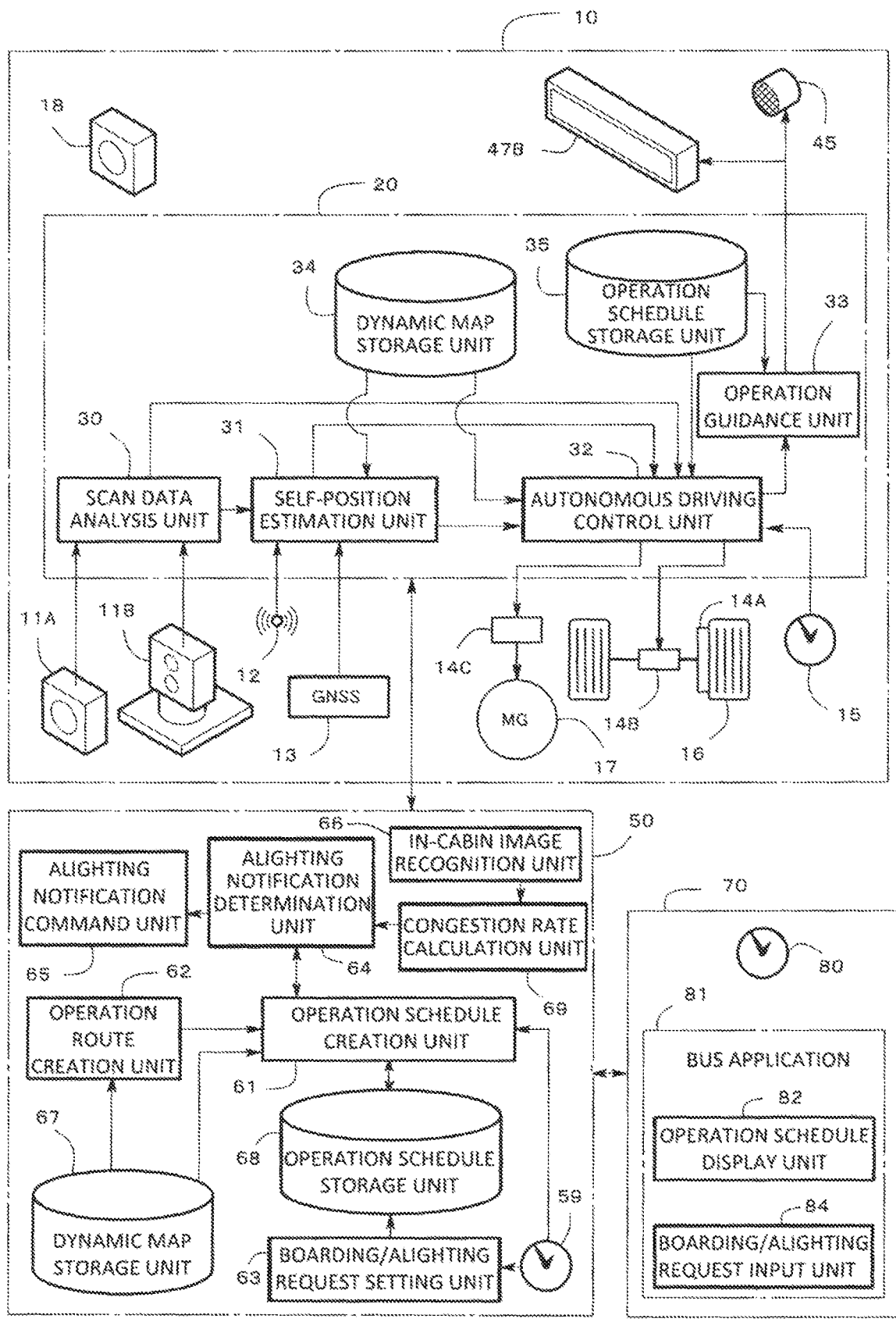
FIG. 3 illustrates functional blocks of the operation management system according to the embodiment.

FIG. 2 illustrates hardware configurations of the operation management system according to the present embodiment and a mobile terminal 70 that can access the system. FIG. 3 illustrates functional blocks of the operation management system and the mobile terminal 70. As described above, the operation management system includes at least one of the passenger vehicles 10, and the operation management apparatus 50. The passenger vehicle 10, the operation management apparatus 50, and the mobile terminal 70 can communicate with each other using communication means such as the Internet 95.

Mobile Terminal

The mobile terminal 70 can be operated by prospective passengers of the passenger vehicle 10. The mobile terminal 70 may be, for example, a smartphone, and its hardware configuration includes an input/output controller 71 that controls input/output of data. The mobile terminal 70 also includes a CPU 72 as a computing device, and a ROM 75, a RAM 76, and a storage device 77 as storage units. The storage device 77 may be, for example, a solid state drive (SSD).

The mobile terminal 70 further includes an input unit 73 and a display unit 74. For example, the mobile terminal 70 includes a touch panel in which the input unit 73 and the display unit 74 are integrated. The mobile terminal 70 further includes a positioning unit 78 and a clock 80. The positioning unit 78 is, for example, a receiver that receives positioning signals from a satellite in a global navigation satellite system (GNSS). Various hardware components of the mobile terminal 70 are connected to an internal bus 79.

At least one of the ROM 75 and the storage device 77, which are storage devices, stores a program, which is executed by the CPU 72 to configure a bus application 81 illustrated in FIG. 3 in the mobile terminal 70. The bus application 81 is software for improving the convenience of the transportation service according to the present embodiment, and includes an operation schedule display unit 82 and a boarding/alighting request input unit 84.

The operation schedule display unit 82 displays on the display unit 74 the operation schedule (for example, a timetable) and actual operation status of each of the passenger vehicles 10. For example, the operation schedule and the actual operation status at the stops ST1 to ST3 closest to the current position of the mobile terminal 70 received by the positioning unit 78 are displayed on the display unit 74.

The boarding/alighting request input unit 84 sends a request for any of reserved seats 42A to 42F (see FIG. 6) of the passenger vehicle 10. For example, from the input unit 73 the prospective passenger can reserve any of the reserved seats 42A to 42F by inputting the date and time of boarding, from which of the stops ST1 to ST3 the passenger will board, and at which of the stops ST1 to ST3 the passenger will alight.

Passenger Vehicle

Figure 5:
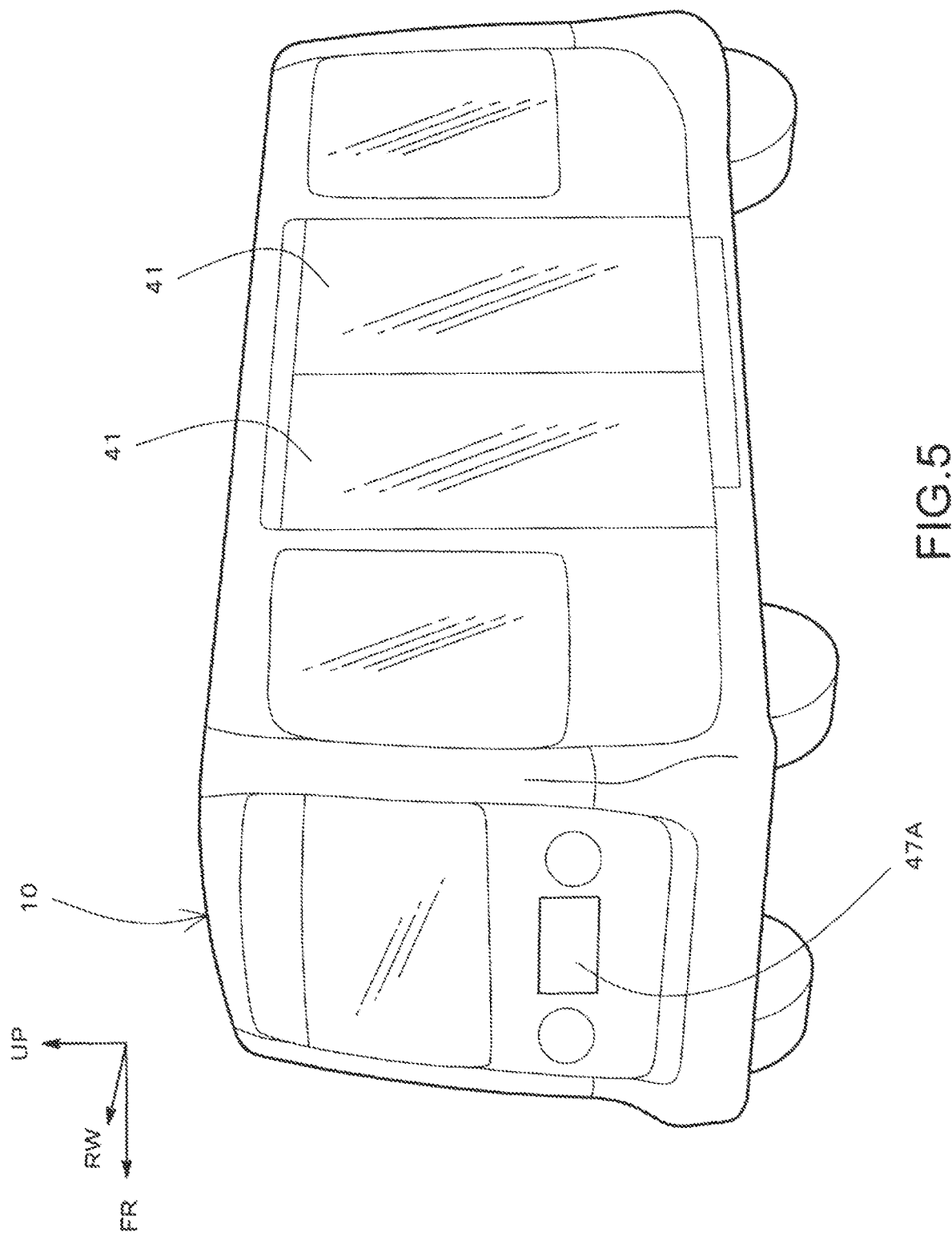
FIG. 5 illustrates an appearance of a passenger vehicle according to the embodiment.
Figure 6:
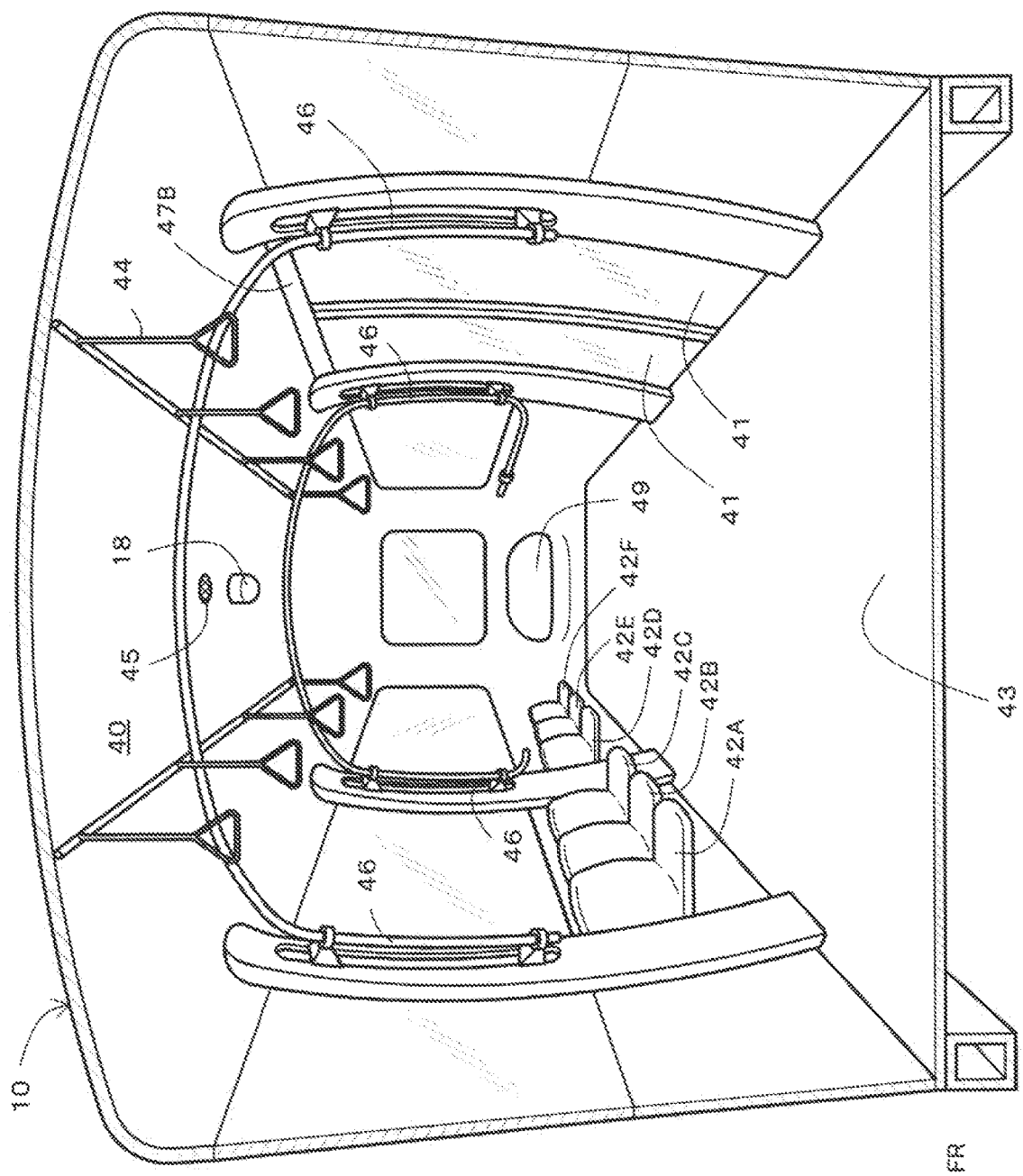
FIG. 6 illustrates an interior of a cabin of the passenger vehicle according to the embodiment.

FIG. 5 illustrates the external appearance of the passenger vehicle 10, and FIG. 6 illustrates the interior of a cabin 40 of the passenger vehicle 10. In FIGS. 5 and 6, the front/rear direction of the vehicle is indicated by the axis represented by a symbol FR, and the width direction is indicated by the axis represented by a symbol RW (right width). The direction of vehicle height is indicated by the axis represented by a symbol UP.

As shown in FIG. 5, the passenger vehicle 10 is used as a passenger bus, and has a pair of doors 41 on the left side that serve as an entrance and an exit. In addition, an exterior display 47A is provided in front of the vehicle. The exterior display 47A is also called a digital signage, and includes a liquid crystal display or an LED display.

As shown in FIG. 6, the cabin 40 has a plurality of passenger seats along its walls. The seats include, for example, the reserved seats 42A to 42F, which can be reserved in advance, and a non-reserved seat 49, which cannot be reserved. For the support of standing passengers, a plurality of hanging straps 44 are provided on the ceiling. In addition, handrails 46 are provided on the side walls of the cabin 40.

An in-vehicle display 47B, which is a notification unit, is located above the doors 41, 41. The in-vehicle display 47B, like the exterior display 47A, includes a liquid crystal display or an LED display. As will be described later, the in-vehicle display 47B displays a text message as the mode of giving an alighting notification. This text message will be a message that prompts standing passengers to ensure an exit route, for example, "The passenger in seat XX will be getting off the next stop. Please cooperate to ensure smooth exiting". This alighting notification message can also be output as voice guidance from an in-vehicle speaker 45, which is a notification unit installed on the ceiling of the cabin 40.

A ceiling camera 18, which is an imaging device, is provided in the center of the ceiling of the cabin 40. For example, the ceiling camera 18 is provided at the center in the width direction and the center in the front/rear direction of the vehicle in the cabin 40. For example, the ceiling camera 18 includes an image sensor such as a CMOS sensor or a CCD sensor.

For example, the ceiling camera 18 may be a so-called 3600 camera, which is capable of imaging the entire passenger space of the cabin 40. For example, the ceiling camera 18 includes an entire floor 43 of the cabin 40 in its field of view.

Figure 7:
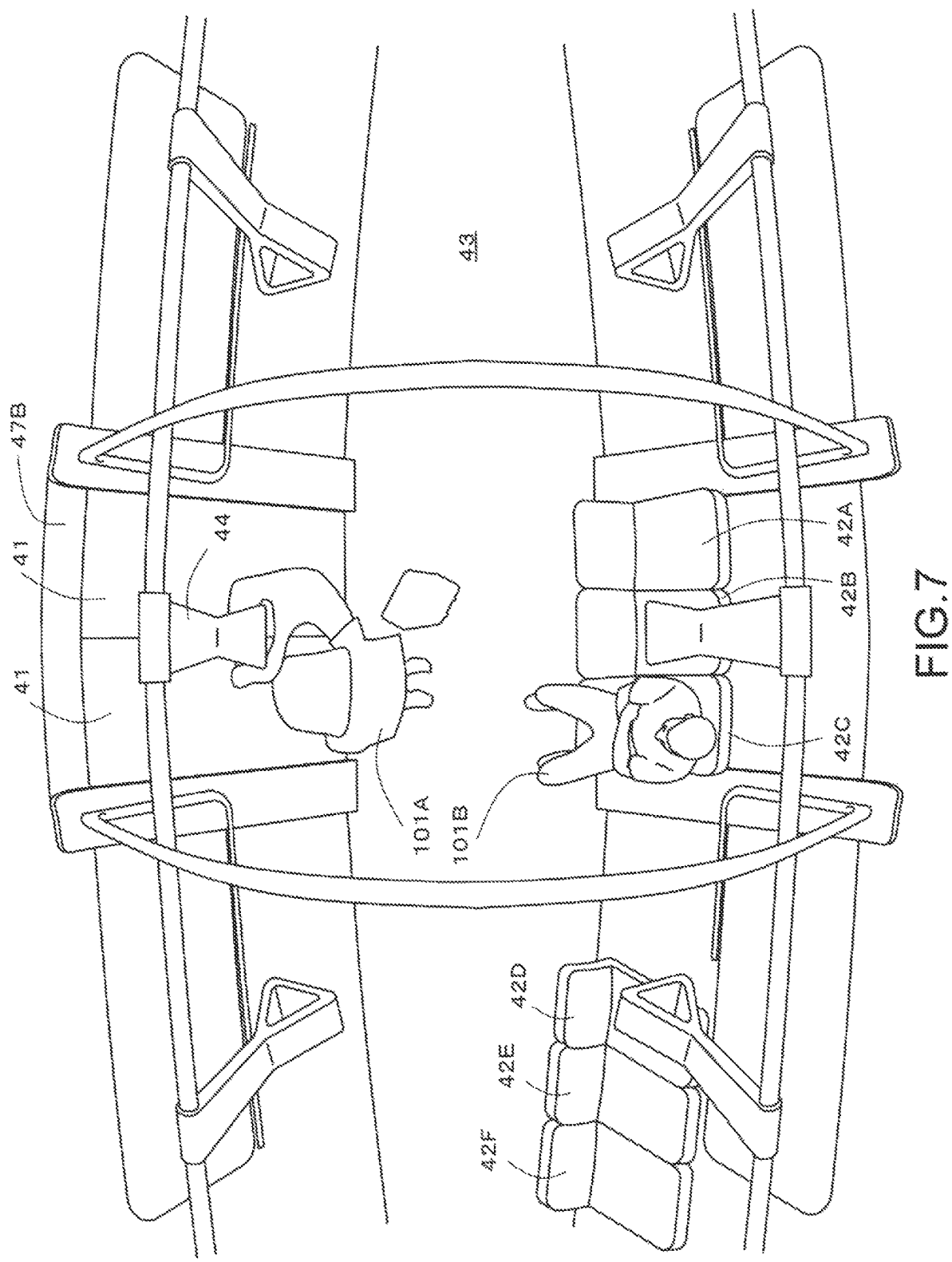
FIG. 7 illustrates an in-cabin image.

The in-cabin image captured by the ceiling camera 18 is, for example, an overhead view image as illustrated in FIG. 7. Using these in-cabin images, the congestion rate A of the cabin 40 can be determined.

As will be described later, the number of passengers in the cabin 40 is calculated in order to calculate the congestion rate A. For the calculation of the number of passengers, for example, the in-cabin image from a side camera (not illustrated) installed on the upper side of the side wall of the cabin 40 may be used instead of the in-cabin image from the ceiling camera 18 installed on the ceiling.

Automatic Operation Control Mechanism of Passenger Vehicle

As described with reference to FIGS. 2 and 3, the passenger vehicle 10 is an automatic vehicle including, for example, an automatic driving function. For example, in the provision of transportation services, when the passenger vehicle 10 travels the defined route 90 (see FIG. 1), the passenger vehicle 10 is capable of automatic operation at Level 4 or Level 5, based on standards by the Society of Automotive Engineers (SAE) in the United States.

The passenger vehicle 10 is used as a passenger bus that automatically drives along the defined route 90, stopping at the stops ST1 to ST3 for passengers to board and alight. For example, the passenger vehicle 10 is a battery electric vehicle (BEV) including a rotary electric motor 17 as its driving source, and a battery (not illustrated) as its power source. The passenger vehicle 10 also includes, as a traveling control mechanism, a brake mechanism 14A, a steering mechanism 14B, and an inverter 14C that controls the output of the rotary electric motor 17.

The passenger vehicle 10 also includes, as a mechanism for acquiring the vehicle's position and grasping the surrounding situation, an exterior camera 11A, a lidar unit 11B, a proximity sensor 12, a positioning unit 13, a clock 15, and a control unit 20. For example, the passenger vehicle 10 includes sensor units on its front, rear, and both sides. The sensor unit includes the exterior camera 11A and the lidar unit 11B.

The lidar unit 11B is a sensor unit for automatic driving, and is a distance measuring unit capable of measuring the distance between the vehicle and objects around the vehicle. The lidar unit 11B uses LiDAR (Light Detection and Ranging), a technology that uses laser light to measure the distance to surrounding objects. The lidar unit 11B is, for example, a solid-state unit that can acquire 3D point cloud data about the surrounding environment of the passenger vehicle 10.

The exterior camera 11A captures the same field of view as the lidar unit 11B. The exterior camera 11A includes an image sensor, such as a CMOS sensor or CCD sensor. The proximity sensor 12 is an infrared sensor and is installed, for example, at the four corners of the passenger vehicle 10 in plan view. For example, when the passenger vehicle 10 arrives at the boarding point, the proximity sensor 12 detects a protruding object such as a curb on the sidewalk. This detection enables precise docking control, which brings the passenger vehicle 10 to a stop in close proximity to the curb. The positioning unit 13 is a satellite-based positioning system, such as a global navigation satellite system.

The control unit 20 may be, for example, an electronic control unit (ECU) of the passenger vehicle 10, and includes a computer (electronic calculator). As shown in FIG. 2, the control unit 20 includes, as its hardware configuration, an input/output controller 21 that controls the input/output of data. The control unit 20 also includes a CPU 22, a GPU 23 (graphics processing unit), and a DLA 24 (deep learning accelerator) as computing devices. The control unit 20 also includes a ROM 25, a RAM 26, and a hard disk drive 27 (HDD) as storage units. The hard disk drive 27 may be replaced with a solid state drive (SSD) or other storage device. These components are connected to an internal bus 28.

At least one of the ROM 25 and the hard disk drive 27, which are storage devices, stores the program for automatic operation control of the passenger vehicle 10. When the CPU 22 and other elements of the control unit 20 execute the above program, functional blocks as illustrated in FIG. 3 are formed in the control unit 20. Alternatively, when the CPU 22 reads a non-transitory storage medium, such as a DVD, on which the program is stored, and executes the program, the functional blocks as illustrated in FIG. 3 are formed in the control unit 20.

That is, the control unit 20 includes a scan data analysis unit 30, a self-position estimation unit 31, an autonomous driving control unit 32, and an operation guidance unit 33 as functional blocks. The control unit 20 also includes a dynamic map storage unit 34 and an operation schedule storage unit 35 as storage units.

The scan data analysis unit 30 acquires the captured images taken by the exterior camera 11A. The scan data analysis unit 30 performs image recognition on the captured images using a known deep learning method. As a result of the image recognition, objects in the captured image are detected, and their attributes (for example, vehicles, passersby, and structures) are recognized.

The scan data analysis unit 30 also acquires 3D point cloud data from the lidar unit 11B. In addition, the scan data analysis unit 30 creates peripheral data by superimposing the coordinates of the captured image after image recognition and the 3D point cloud data. With the peripheral data, it is possible to detect the attribute of the object and how far away it is from the passenger vehicle 10. The peripheral data is sent to the autonomous driving control unit 32.

The self-position estimation unit 31 acquires self-position information (latitude and longitude) from the positioning unit 13. For example, the self-position estimation unit 31 acquires self-position information from a satellite. The self-position information (vehicle position information) thus acquired is sent to the autonomous driving control unit 32.

The dynamic map storage unit 34 stores the operation route map data created by an operation route creation unit 62 of the operation management apparatus 50. This operation route map data includes dynamic map data, which will be described later. The operation schedule storage unit 35 stores the operation schedule (see FIG. 4) created by an operation schedule creation unit 61 of the operation management apparatus 50.

The autonomous driving control unit 32 performs driving control of the passenger vehicle 10 based on the operation route map data stored in the dynamic map storage unit 34, the self-position information (vehicle position information) transmitted from the self-position estimation unit 31, and the peripheral data transmitted from the scan data analysis unit 30. Once arriving at the stop ST1 to ST3, the passenger vehicle 10 waits at the stop ST1 to ST3 until the departure time set in the operation schedule.

Operation Management Apparatus

As described with reference to FIG. 1, the operation management apparatus 50 is installed, for example, in a management company that provides transportation services using a plurality of the passenger vehicles 10. The operation management apparatus 50 includes, for example, a computer (electronic calculator). As shown in FIG. 2, the operation management apparatus 50 includes, as its hardware configuration, an input/output controller 51 that controls the input/output of data. The operation management apparatus 50 also includes a CPU 52A, a GPU 52B, a DLA 52C, an input unit 53, a display unit 54, a ROM 55, a RAM 56, a hard disk drive 57 (HDD), and a clock 59. The hard disk drive 57 may be replaced with a solid state drive (SSD) or other storage device. These components are connected to an internal bus 58.

At least one of the ROM 55 and the hard disk drive 57, which are storage devices, stores the program for automatic operation management. When the above program is executed by the CPU 52A and others of the operation management apparatus 50, functional blocks as illustrated in FIG. 3 are formed in the operation management apparatus 50. Alternatively, when the CPU 52A reads a non-transitory storage medium, such as a DVD, on which the program is stored, and executes the program, the functional blocks as illustrated in FIG. 3 are formed in the operation management apparatus 50.

That is, the operation management apparatus 50 includes an operation schedule storage unit 68 and a dynamic map storage unit 67 as storage units. The operation management apparatus 50 also includes the operation schedule creation unit 61, the operation route creation unit 62, a boarding/alighting request setting unit 63, an alighting notification determination unit 64, an alighting notification command unit 65, an in-cabin image recognition unit 66, and a congestion rate calculation unit 69 as functional units.

The dynamic map storage unit 67 stores dynamic map data, which are map data. The dynamic map is a three-dimensional map in which, for example, the position and shape of a roadway (three-dimensional shape) are stored. The three-dimensional shape of the roadway includes, for example, slope and width. Further, the positions of lanes, crosswalks, stop lines, and the like drawn on the roadway are also stored in the dynamic map. In addition, the positions and shapes (3D shapes) of structures around the road, such as stops, buildings, and traffic lights, are also stored in the dynamic map. Furthermore, the position and shape of the parking lot is also stored in the dynamic map.

For example, in a dynamic map, a geographic coordinate system including latitude and longitude is used. When the passenger vehicle 10 is running automatically, the operation route creation unit 62 extracts dynamic map data from the dynamic map storage unit 67 and creates operation map data including travel routes and stop positions.

The operation schedule creation unit 61 creates an operation schedule (in other words, an operation timetable) for the passenger vehicle 10. For example, upon receiving the operation map data from the operation route creation unit 62, the operation schedule creation unit 61 creates an operation schedule based on the travel route, the rated speed of the passenger vehicle 10, and the standard stopping times at the stops ST1 to ST3.

FIG. 4 illustrates an operation schedule table, which is provided to the passenger vehicle 10. In the operation schedule table, the scheduled arrival and departure times of the stops ST1 to ST3, as well as the time when the vehicle is to pass through the operation schedule update point Pu (see FIG. 1), the scheduled time when it is to pass through the collection point Pout, and the scheduled time when it is to pass through the sending point Pin.

In addition, the operation schedule table has a column where the actual passing, arrival, and departure times for each point are recorded and a column where the congestion rate is entered. In addition, the operation schedule table has columns for recording whether or not a request has been made for boarding or alighting, and the age information of the prospective passenger.

The reserved seat number is recorded in the columns for boarding and alighting request. As will be discussed later, the age of the prospective passenger is recorded, for example, to determine whether the passenger is a child or not. For example, as will be described later, an alighting notification is made in the vehicle on behalf of children who are uncomfortable speaking, so as to prompt standing passengers to move when they alight.

For example, the operation schedule creation unit 61 creates a schedule for one round (overall schedule) of the defined route 90, starting from the operation schedule update point Pu, for all the passenger vehicles 10-1 to 10-4 traveling on the defined route 90 (see FIG. 1). This overall schedule is stored in the operation schedule storage unit 68.

The operation schedule creation unit 61 also creates individual operation schedules (individual schedules) for each of the passenger vehicles 10-1 to 10-4 independently based on the overall schedule. As illustrated in FIG. 4, as an individual schedule, a schedule for one round of the passenger vehicle 10 is created, starting from the operation schedule update point Pu. The created individual schedule is provided to the passenger vehicle 10 when the passenger vehicle 10 passes through the operation schedule update point Pu. The operation schedule (individual schedule) thus provided is stored in the operation schedule storage unit 35 in the passenger vehicle 10.

As described with reference to FIG. 3, the boarding/alighting request setting unit 63 receives boarding request information input from the mobile terminal 70 (for example, a smartphone) of a prospective passenger, and stores it in the operation schedule storage unit 68. The boarding request information includes the stop where the prospective passenger is scheduled to board, the scheduled alighting stop, and the reserved seat number where the passenger is scheduled to be seated. The boarding request information includes the age information of the prospective passenger, which is associated with the above items. In addition, the desired time and car to board may also be included in the boarding request information.

For example, as shown in the operation schedule in FIG. 4, the boarding request information for a 9-year-old prospective passenger who will board at the stop ST2 and be seated in the reserved seat 42B is set. The operation schedule also includes the boarding request information for 65- and 63-year-old prospective passengers who will board at the stop ST3 and be seated in the reserved seats 42D and 42E, and the alighting request information for a 9-year-old passenger seated in the reserved seat 42B who will alight at the stop ST3. In this manner, the boarding request information set by the boarding/alighting request setting unit 63 is stored in the operation schedule storage unit 68.

The alighting notification determination unit 64 performs alighting determination to determine whether or not the next stop of the passenger vehicle 10 is set as the scheduled alighting stop. This alighting determination is executed, for example, in the process of the passenger vehicle 10 leaving the current stop and heading to the next stop. In making this alighting determination, the alighting notification determination unit 64 refers to the boarding/alighting request information stored in the operation schedule storage unit 68. The details of the alighting determination are described later.

The alighting notification command unit 65 determines whether or not to make an alighting notification, based on the result of the alighting determination by the alighting notification determination unit 64 and the congestion rate A calculated by the congestion rate calculation unit 69 of the passenger vehicle 10.

As will be described in detail later, in this determination process, when the alighting determination determines that the alighting request information in which the next stop is set as the scheduled alighting stop is set, and the congestion rate A is more than the predetermined congestion threshold K1, the alighting notification command unit 65 commands the notification unit to make an alighting notification via the operation guidance unit 33 of the passenger vehicle 10. The notification unit includes at least one of the in-vehicle speaker 45 and the in-vehicle display 47B. Upon receiving the notification command, the in-vehicle speaker 45 and the in-vehicle display 47B, which are the notification units, output an operation guidance message (voice message and text message).

On the other hand, even if the next stop is set as the scheduled alighting stop, when the congestion rate A is in a low congestion state less than or equal to the predetermined congestion threshold K1, the alighting notification command unit 65 does not command the notification unit (in-vehicle speaker 45 and in-vehicle display 47B) to make an alighting notification. Since no alighting notification is made during low congestion times when the exit route is secured, unnecessary movement of standing passengers can be avoided.

Calculation of Congestion Rate 1

The in-cabin image recognition unit 66 acquires the in-cabin images captured by the ceiling camera 18 of the passenger vehicle 10 and recognizes the image area of the passenger included in the images. For example, in the in-cabin image recognition unit 66, a single shot multibox detector (SSD) using supervised learning is implemented as an image recognition algorithm.

Since the SSD algorithm is a known technology, it is described herein only briefly. In the SSD algorithm, position and class estimation in the captured image is performed. That is, the two types of estimation; i.e., where the object is located in the image and what is the attribute (class) of the object, are done in parallel; i.e., in a single shot using a neural network.

Figure 8:
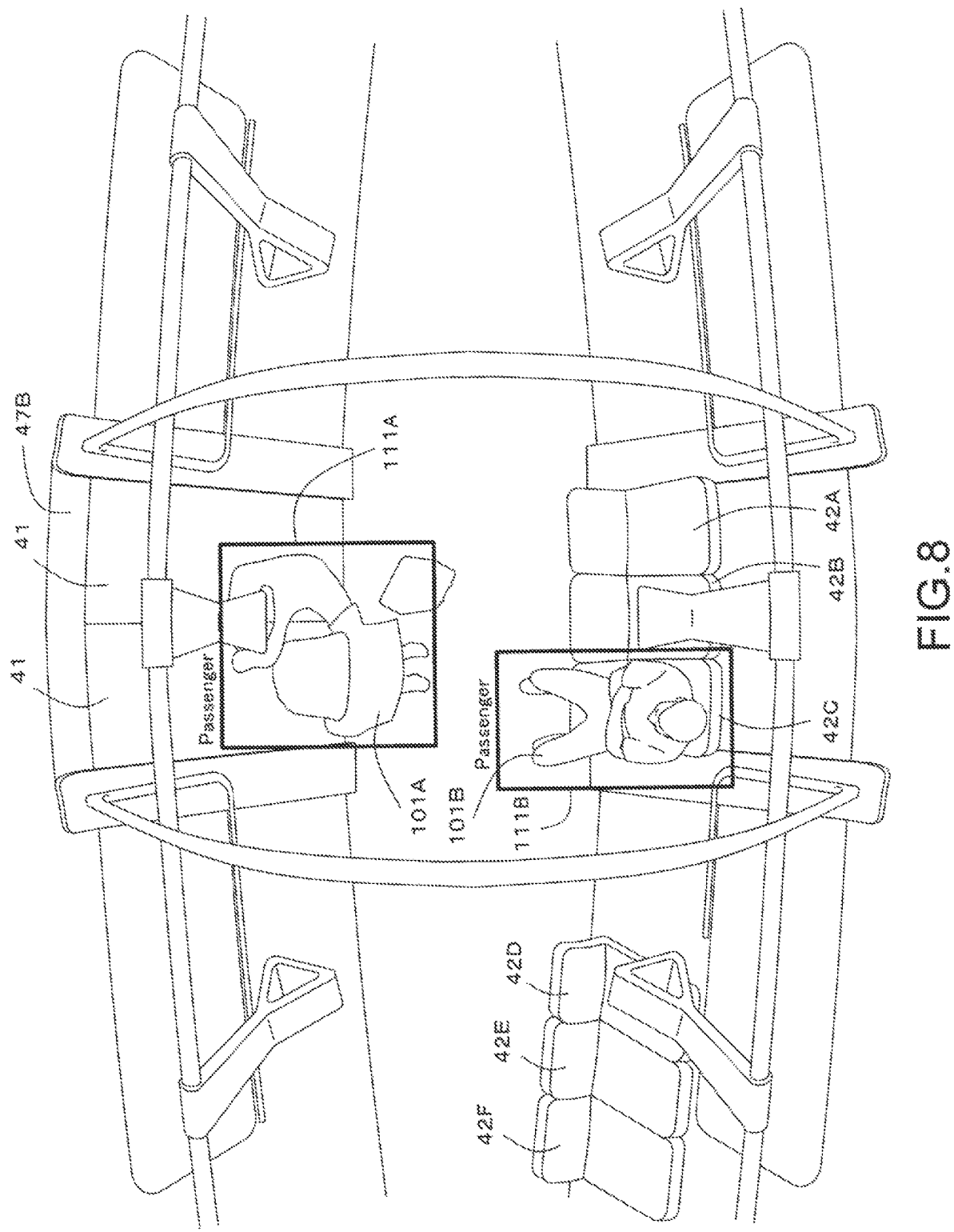
FIG. 8 illustrates image recognition based on an SSD algorithm performed on an in-cabin image.

In the SSD algorithm, when detecting a person, instead of extracting the boundary between the person and the outside of the person, the boundary of the person is defined by a rectangular "bounding box" as illustrated in FIG. 8. For example, in the SSD algorithm, a plurality of rectangular frames called default boxes of different sizes and shapes (for example, a little less than 10,000 frames) are fitted on the image to estimate the position of the object, and it is calculated which of the frames can contain the object without any excess or deficiency. In addition, each bounding box displays the attribute (class) of the object captured in that box.

The in-cabin image recognition unit 66 recognizes passengers 101A and 101B in the captured image and encloses them in bounding boxes 111A and 111B, and assigns the value of the attribute "Passenger" to the recognized passengers. In order to enable such image recognition, for example, SSD algorithms are learned using supervisory data. This supervisory data include a pair of supervisory data sets with standing and seated human images as input data and the class "Passenger" and the position parameters of the bounding box surrounding the passenger as output data.

Each bounding box is given a position parameter. That is, the center coordinates of the box in the plane coordinates C [Cx,Cy] of the captured image, the box width W, and the box height H are given as the position parameters of the bounding box.

The congestion rate calculation unit 69 counts the number of passengers Np recognized by the in-cabin image recognition unit 66. In addition, the congestion rate calculation unit 69 refers to the capacity Nc of the passenger vehicle 10. The capacity Nc is stored, for example, in a storage unit (not illustrated) of the passenger vehicle 10. The congestion rate calculation unit 69 calculates the congestion rate A [%] from the ratio of the number of passengers Np to the capacity Nc (A=Np/Nc). The congestion rate A thus calculated is sent to the alighting notification determination unit 64 of the operation management apparatus 50.

Calculation of Congestion Rate 2

Instead of using the number of passengers to calculate the congestion rate A, the area occupied by the bounding box may be used to calculate the congestion rate A. As described above, the bounding box includes the box width W and the box height H as its position parameters. The area Sb of the bounding box can be obtained from the product of the box width W and the box height H. The area Sb of the bounding box is used as the occupied area of passengers. The occupied area of passengers can be determined with higher accuracy by using the overhead view image from the ceiling camera 18 as compared to the side view image from a side camera that captures images of the interior of the cabin from the side of the vehicle.

The congestion rate calculation unit 69 calculates the sum total ΣSb of the areas Sb of bounding boxes that compartmentalize passengers recognized by the in-cabin image recognition unit 66. Furthermore, the congestion rate calculation unit 69 calculates the congestion rate in the cabin 40 based on the sum total area ΣSb and the floor area Sa of the cabin 40. Specifically, the congestion rate calculation unit 69 calculates as the congestion rate A the ratio of the total area ΣSb occupied by passengers to the cabin floor area Sa (ΣSb/Sa)×100 [%].

Process of Alighting Notification Determination

Figure 9:
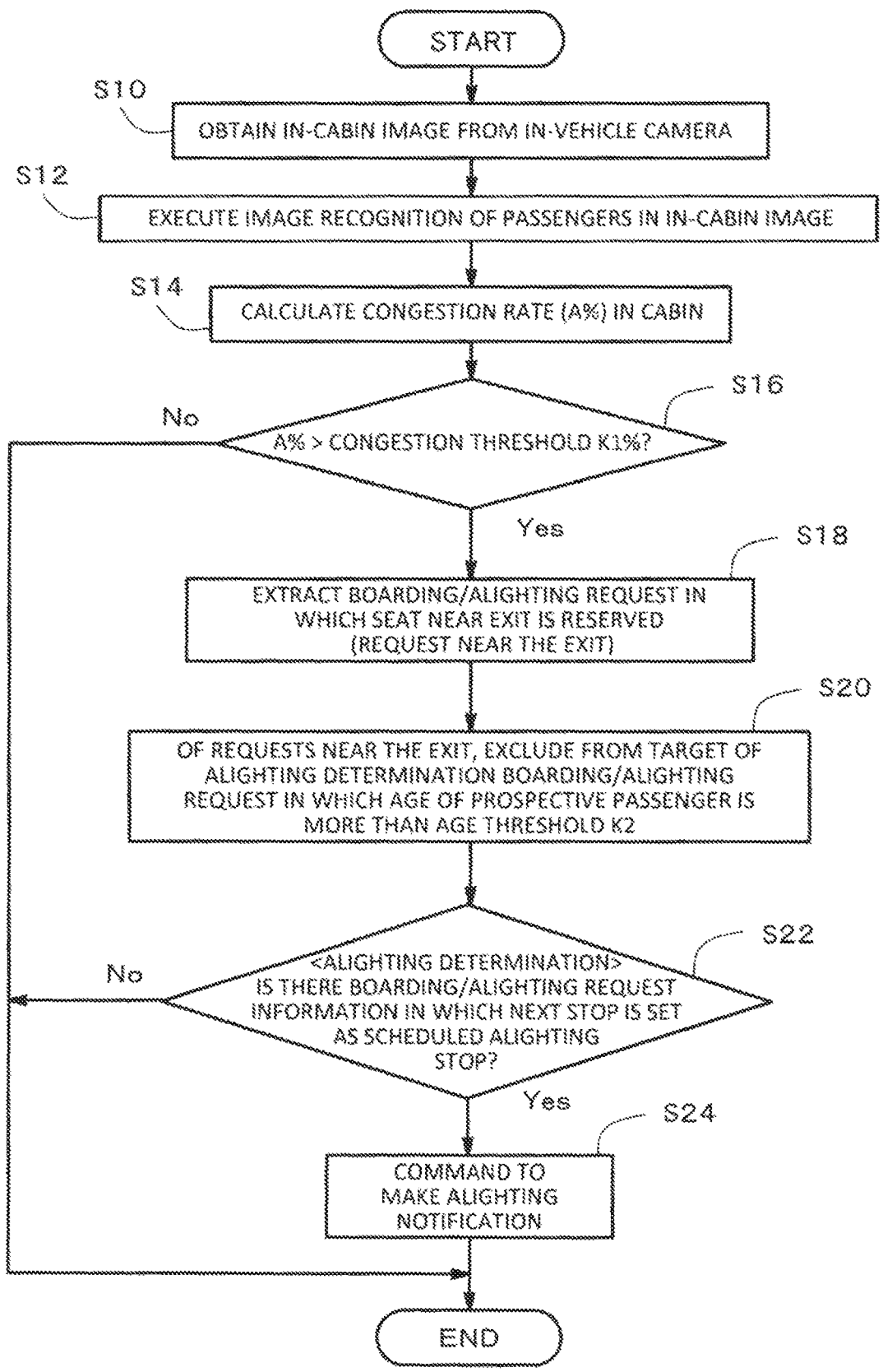
FIG. 9 illustrates a flowchart of the process of alighting notification determination.

FIG. 9 illustrates the process of alighting notification determination in the operation management system according to the present embodiment. Each step of this process is executed in the operation management apparatus 50.

These steps are executed, for example, in the process of the passenger vehicle 10 leaving the current stop and heading to the next stop. For example, at the time of leaving the current stop, the process of alighting notification determination in FIG. 9 is executed. For example, the departure time from the current stop is sent to the operation management apparatus 50 by the operation guidance unit 33 of the passenger vehicle 10. The process in FIG. 9 is triggered by the receipt of the departure time.

In the process described below, as the operation schedule in FIG. 10, the current stop is the stop ST2 and the next stop is the stop ST3. For the sake of convenience, the following description will focus on the process of alighting notification executed for the passenger vehicle 10-1 among the passenger vehicles 10-1 to 10-4 traveling in FIG. 1. Naturally, the process of alighting notification in FIG. 9 can be executed for all of the passenger vehicles 10-1 to 10-8.

When the passenger vehicle 10-1 leaves the current stop ST2, the in-cabin image recognition unit 66 acquires the in-cabin image captured by the ceiling camera 18, which is an in-vehicle camera (S10). This in-cabin image is captured by the ceiling camera 18 in the process of the passenger vehicle 10-1 leaving the current stop ST2 and heading to the next stop ST3. The in-cabin image recognition unit 66 performs image recognition of the passengers in the in-cabin image, as illustrated in FIG. 8 (S12).

Next, the congestion rate calculation unit 69 calculates the congestion rate A in the cabin 40 based on the passengers recognized by the in-cabin image recognition unit 66. The congestion rate calculation unit 69 calculates the congestion rate A [%] from the ratio of the number of passengers Np to the capacity Nc (A=Np/Nc) of the passenger vehicle 10 (S14). Alternatively, the congestion rate calculation unit 69 calculates the sum total ΣSb of the areas Sb of the bounding boxes of passengers, and also calculates the congestion rate A [%], which is the ratio of the sum total area ΣSb to the cabin floor area Sa.

Next, the congestion rate calculation unit 69 determines whether or not the received congestion rate A of the passenger vehicle 10-1 exceeds the predetermined congestion threshold K1 (S16). The congestion threshold K1 may be, for example, a value of 70% or more and 100% or less.

When the congestion rate A is less than or equal to the congestion threshold K1, the process of the alighting notification determination in FIG. 9 is completed. That is, the alighting notification determination unit 64 does not make an alighting determination. On the other hand, when the congestion rate A is more than the congestion threshold K1, the congestion rate calculation unit 69 sends a notification to the alighting notification determination unit 64 that the cabin is congested. In response to this, the alighting notification determination units 64 refers to the operation schedule of the passenger vehicle 10-1 stored in the operation schedule storage unit 68, in particular the boarding/alighting request information, and executes the alighting determination.

Here, the alighting notification determination unit 64 executes its pre-processing (S18 and S20) prior to the alighting determination to be described later. In this pre-processing, a boarding/alighting request in which a seat included in a predetermined vicinity from the exit (door 41) of the passenger vehicle 10-1 is set as a reserved seat is excluded from the target of the alighting determination executed in step S22. For example, as the seat near the exit, with reference to FIG. 6, a boarding/alighting request that sets any of the reserved seats 42A to 42C opposite the exit as a reserved seat is excluded from the target of the alighting determination.

In the following, to avoid redundant descriptions, "a boarding/alighting request that sets a seat included within a predetermined vicinity of the exit (door 41) (reserved seats 42A to 42C) of the passenger vehicle 10-1 as a reserved seat" is appropriately described as "a request near the exit".

The process of alighting notification determination is a process to promote smooth formation of an exit route when the vehicle is congested. However, when the reserved seats 42A to 42C near the exit (door 41) have a short exit route even when congested, alighting passengers can form an exit route by simply speaking to a few standing passengers near the exit (door 41).

In this manner, by excluding from the target of the alighting determination requests near the exit, where it is easy to form an exit route, it is possible to reduce the number of times the alighting notification, and thus maintain the quietness of the cabin.

The alighting notification determination unit 64 refers to the operation schedule for the passenger vehicle 10-1 stored in the operation schedule storage unit 68. Then, the alighting notification determination unit 64 extracts the requests near the exit (S18).

Here, between step S18 (extraction of requests near the exit) and step S22 (alighting determination), a step S20 to confirm the age of the prospective passenger may be optionally provided. When the passenger seated in any of the reserved seats 42A to 42C near the exit is a child, the child may be uncomfortable speaking to the standing passengers, making it difficult to form an exit route.

Therefore, in step S20, the alighting notification determination unit 64 checks the age of the prospective passenger set in the request near the exit. Then, the boarding/alighting request in which the age of the prospective passenger is more than the predetermined age threshold K2 (for example, 15 years) is excluded from the target of the alighting determination (S22). The boarding/alighting request in which the age of the prospective passenger is less than or equal to the age threshold K2 is set as the target of the alighting determination.

Next, the alighting notification determination unit 64 executes the alighting determination (S22), which determines whether or not there is boarding/alighting request information in which the next stop ST3 of the passenger vehicle 10-1 is set as the scheduled alighting stop. For example, in the example of FIG. 10, the stop where the passenger in the reserved seat 42B is scheduled to alight is set to the next stop ST3 of the passenger vehicle 10-1. In this case, the alighting notification determination unit 64 transmits to the alighting notification command unit 65 the result of the judgment that the alighting setting exists.

On the other hand, when there is no boarding/alighting request information that specifies the next stop ST3 of the passenger vehicle 10-1 as the scheduled alighting stop, the alighting notification determination unit 64 transmits to the alighting notification command unit 65 the result of the judgment that there is no alighting setting.

Upon receiving the result of the judgment that there is no alighting setting, the alighting notification command unit 65 terminates the alighting notification determination process in FIG. 9. As a result, no notification command is input to the in-vehicle speaker 45 and the in-vehicle display 47B, which are the notification units, so the in-vehicle speaker 45 and the in-vehicle display 47B do not make an alighting notification in the process of the passenger vehicle 10-1 heading to the next stop.

On the other hand, upon receiving the result of the judgment that there is an alighting setting from the alighting notification determination unit 64, the alighting notification command unit 65 commands the in-vehicle speaker 45 and the in-vehicle display 47B, which are the notification units, to make an alighting notification via the operation guidance unit 33 of the passenger vehicle 10-1 (S24). At this time, the reserved seat information (for example, reserved seat number) of the passenger who is to alight at the next stop ST3 may be sent to the operation guidance unit 33. Upon receiving the notification command and the reserved seat information, the in-vehicle speaker 45 and the in-vehicle display 47B output an alighting notification that the passenger with the received reserved seat information will alight at the next stop ST3.

According to the above process of alighting notification, the in-vehicle speaker 45 and the in-vehicle display 47B, which are the notification units, make an alighting notification when the cabin 40 is congested (congestion rate A>congestion threshold K1). On the other hand, when the cabin 40 is not congested (congestion rate A≤congestion threshold K1), the in-vehicle speaker 45 and the in-vehicle display 47B do not make an alighting notification in the process of the passenger vehicle 10 heading to the next stop. Especially in the latter case, unnecessary movement of passengers, especially standing passengers, can be avoided.

Another Process of Alighting Notification Determination

Figure 11:
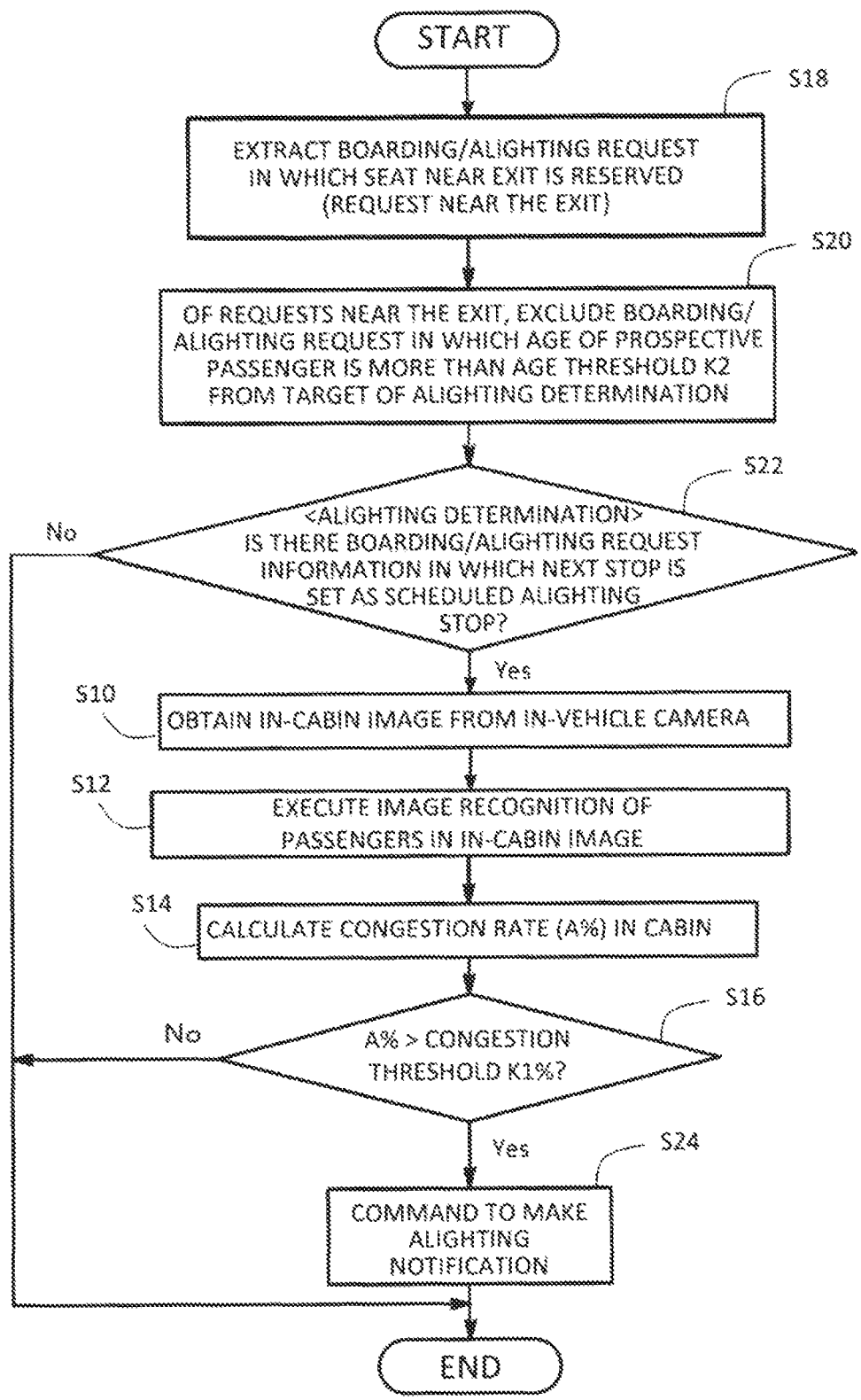
FIG. 11 illustrates another flowchart of the process of alighting notification determination.

In the example of FIG. 9, the alighting determination and its pre-processing (S18 to S22) are performed according to whether or not the congestion rate A is more than the congestion threshold K1, but this order may be reversed. Another process of the alighting notification determination is illustrated in FIG. 11. In this process, the departure time from the current stop is sent to the operation management apparatus 50 by the operation guidance unit 33 of the passenger vehicle 10. The process in FIG. 11 is triggered by the receipt of this departure time.

In this process, first, the alighting notification determination and its pre-processing (S18 to S22) are executed by the alighting determination unit 64. When the alighting notification determination unit 64 determines that there is no alighting setting, the process may be terminated as it is. On the other hand, when the alighting notification determination unit 64 determines that there is an alighting setting, the in-cabin image recognition unit 66 and the congestion rate calculation unit 69 of the passenger vehicle 10 calculate the congestion rate A (S10 to S14).

Then, when the congestion rate A exceeds the congestion threshold K1 (S16), the alighting notification command unit 65 commands the in-vehicle speaker 45 and the in-vehicle display 47B, which are the notification units, to make an alighting notification (S24).

On the other hand, when the congestion rate A is equal to or less than the congestion threshold K1, the alighting notification command unit 65 does not command the in-vehicle speaker 45 and the in-vehicle display 47B to make an alighting notification (no notification is made). Since no notification command is input, the in-vehicle speaker 45 and the in-vehicle display 47B do not make an alighting notification in the process of the passenger vehicle 10 heading to the next stop.

According to the process in FIG. 11, the congestion rate A is calculated after the result of the alighting determination is obtained. Depending on the result of the alighting determination; i.e., when the determination result is that there is no alighting setting, the image recognition processing required for the calculation of the congestion rate A can be omitted, thus reducing the computational load on the operation management apparatus 50.

Another Example of Operation Management System

Figure 12:
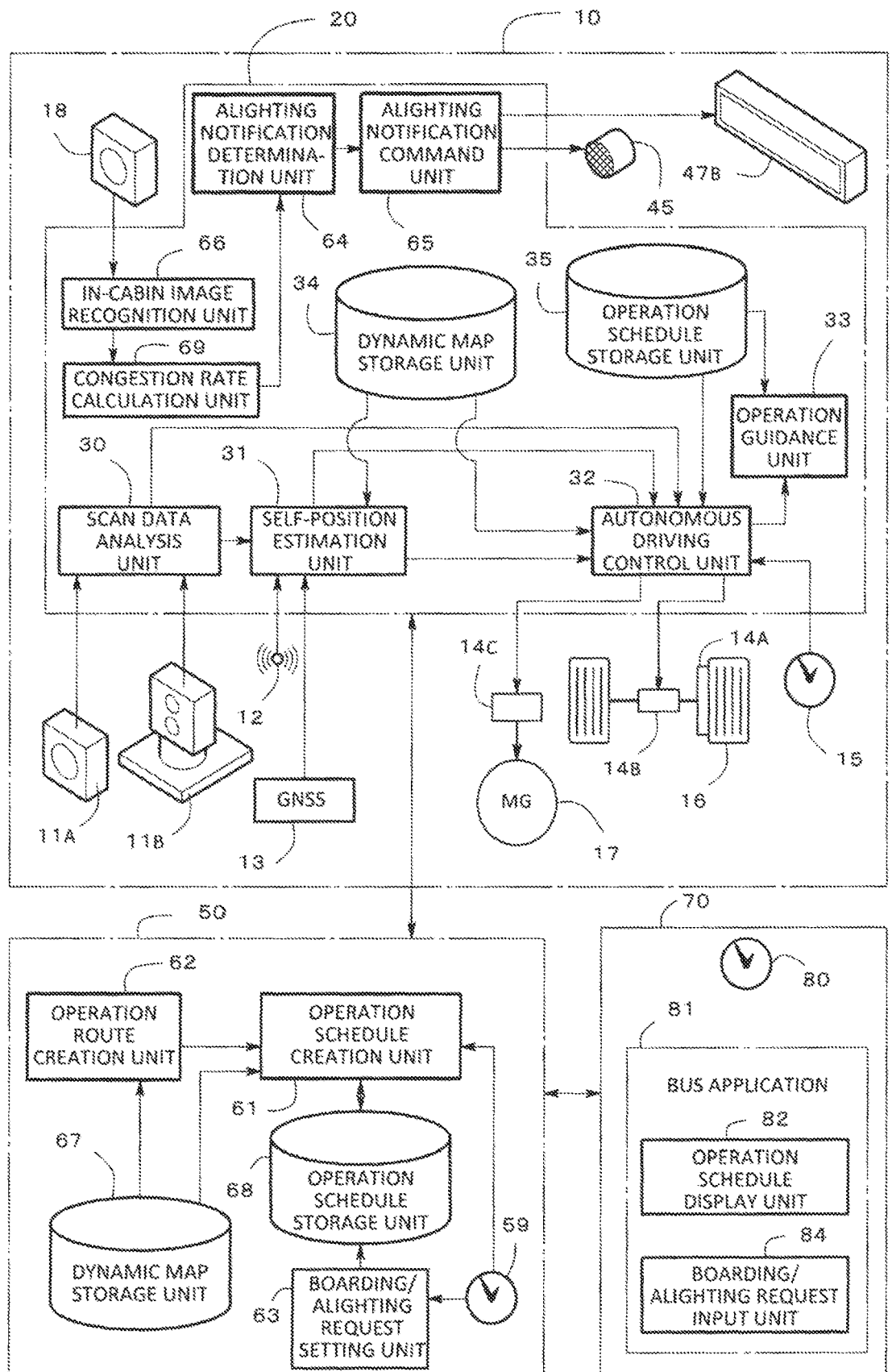
FIG. 12 illustrates functional blocks of the operation management system according to another example of the present embodiment.

FIG. 12 illustrates another example of the operation management system in FIG. 3. In FIG. 12, the alighting notification determination unit 64, the alighting notification command unit 65, the in-cabin image recognition unit 66, and the congestion rate calculation unit 69, which are installed in the operation management apparatus 50 in FIG. 3, are installed in the passenger vehicle 10. The remainder of the configuration is the same as in FIG. 3.

The functional blocks as illustrated in FIG. 12 are formed by the CPU 22 and other elements executing the program for automatic operation control and operation management of the passenger vehicle 10, as in FIG. 3. This program is stored in at least one of the ROM 25 and the hard disk drive 27, which are the storage devices, or in a non-transitory storage medium such as a DVD.

In this configuration, the alighting notification determination process in FIGS. 9 and 11 is executed independently by the passenger vehicle 10. That is, all of the steps in FIGS. 9 and 11 are executed in the passenger vehicle 10. For example, the result of the alighting determination and the congestion rate A in FIGS. 9 and 11 are sent to the operation schedule creation unit 61 of the operation management apparatus 50 after the process is completed.

The present disclosure is not limited to the present embodiments described above, and includes all changes and modifications without departing from the technical scope or the essence of the present disclosure defined by the claims.

The invention claimed is:

1. An operation management system comprising: a passenger vehicle capable of traveling a defined route and stopping at stops along the defined route; and an operation management apparatus that manages an operation of the passenger vehicle,
    wherein the passenger vehicle includes an imaging device that captures an image of an interior of a cabin of the vehicle,
    the operation management apparatus includes:
    an image recognition unit that recognizes passengers in the in-cabin image captured by the imaging device in the process of the passenger vehicle leaving the current stop and heading to the next stop; and
    a congestion rate calculation unit that calculates a congestion rate in the cabin based on the recognized passengers, and
    the passenger vehicle further includes a notification unit that is capable of giving an alighting notification that notifies the presence of a passenger who is alighting at the next stop and seat information of the passenger when the congestion rate is more than a predetermined congestion threshold, and that does not make an alighting notification when the congestion rate is less than or equal to the congestion threshold in the process of the passenger vehicle heading to the next stop.

2. The operation management system according to claim 1,
    wherein the operation management apparatus includes:

a storage unit that stores a boarding/alighting request in which a scheduled alighting stop and a reserved seat in the passenger vehicle are set;

a determination unit capable of referring to the boarding/alighting request and making an alighting determination of determining whether or not the next stop of the passenger vehicle is set as the scheduled alighting stop; and a command unit that commands the notification unit to make the alighting notification when the alighting determination determines that the next stop of the passenger vehicle is set as the scheduled alighting stop, and the determination unit executes the alighting determination when the congestion rate is more than the congestion threshold, and does not execute the alighting determination when the congestion rate is less than or equal to the congestion threshold.

3. The operation management system according to claim 1, wherein the operation management apparatus includes:

a storage unit that stores a boarding/alighting request in which a scheduled alighting stop and a reserved seat in the passenger vehicle are set;

a determination unit that refers to the boarding/alighting request and performs an alighting determination to determine whether or not the next stop of the passenger vehicle is set as the scheduled alighting stop; and a command unit capable of commanding the notification unit to make the alighting notification when the alighting determination determines that the next stop of the passenger vehicle is set as the scheduled alighting stop, and the command unit commands the notification unit to make the alighting notification when the congestion rate is more than the congestion threshold, and does not command the notification unit to make the alighting notification when the congestion rate is less than or equal to the congestion threshold.

4. The operation management system according to claim 2, wherein the determination unit excludes from a target of the alighting determination the boarding/alighting request that sets a seat included within a predetermined vicinity from an exit of the passenger vehicle as the reserved seat.

5. The operation management system according to claim 2, wherein the boarding/alighting request stores age information of a prospective passenger in association with the scheduled alighting stop and the reserved seat, and the determination unit excludes from the target of the alighting determination the boarding/alighting request in which a seat included within a predetermined vicinity from the exit of the passenger vehicle is set as the reserved seat and an age of the prospective passenger is more than a predetermined age threshold.

6. A passenger vehicle capable of traveling a defined route and stopping at stops along the defined route, the passenger vehicle comprising:

an imaging device that captures an image of an interior of a cabin of the vehicle;

an image recognition unit that recognizes passengers in the in-cabin image captured by the imaging device in the process of the vehicle leaving the current stop and heading to the next stop;

a congestion rate calculation unit that calculates a congestion rate in the cabin based on the recognized passengers; and a notification unit that is capable of giving an alighting notification that notifies the presence of a passenger who is alighting at the next stop and seat information of the passenger when the congestion rate is more than a predetermined congestion threshold, and that does not make an alighting notification when the congestion rate is less than or equal to the congestion threshold in the process of the passenger vehicle heading to the next stop.

7. The passenger vehicle according to claim 6, further comprising:

a storage unit that stores a boarding/alighting request in which a scheduled alighting stop and a reserved seat are set;

a determination unit capable of referring to the boarding/alighting request and making an alighting determination of determining whether or not the next stop is set as the scheduled alighting stop; and a command unit that commands the notification unit to make the alighting notification when the alighting determination determines that the next stop is set as the scheduled alighting stop, wherein the determination unit executes the alighting determination when the congestion rate is more than the congestion threshold, and does not execute the alighting determination when the congestion rate is less than or equal to the congestion threshold.

8. The passenger vehicle according to claim 6, further comprising:

a storage unit that stores a boarding/alighting request in which a scheduled alighting stop and a reserved seat are set;

a determination unit that refers to the boarding/alighting request and performs an alighting determination to determine whether or not the next stop is set as the scheduled alighting stop; and a command unit capable of commanding the notification unit to make the alighting notification when the alighting determination determines that the next stop is set as the scheduled alighting stop, wherein the command unit commands the notification unit to make the alighting notification when the congestion rate is more than the congestion threshold, and does not command the notification unit to make the alighting notification when the congestion rate is less than or equal to the congestion threshold.

9. The passenger vehicle according to claim 7, wherein the determination unit excludes from a target of the alighting determination the boarding/alighting request that sets a seat included within a predetermined vicinity from an exit of the passenger vehicle as the reserved seat.

10. The passenger vehicle according to claim 7, wherein the boarding/alighting request stores age information of a prospective passenger in association with the scheduled alighting stop and the reserved seat, and the determination unit excludes from the target of the alighting determination the boarding/alighting request in which a seat included within a predetermined vicinity from the exit is set as the reserved seat and an age of the prospective passenger is more than a predetermined age threshold.

* * * * *